United States Patent Office 2,865,918
Patented Dec. 23, 1958

2,865,918

DIAMINOPOLYSILOXANES

Marvin J. Hurwitz, Elkins Park, and Peter L. de Benneville, Philadelphia, Pa., assignors to Rohm & Haas Company, Philadelphia, Pa., a corporation of Delaware No Drawing. Application June 1, 1955
Serial No. 512,573

7 Claims. (Cl. 260—247.5)

This invention relates to polysiloxanes having terminal amino groups attached directly to silicon and to the methods for the preparation of such compounds.

It is an object of the present invention to provide a new class of compounds which may be designated as aminopolysiloxanes which have a wide range of reactivity and are adapted to impart water-repellency, reduced shrinkage characteristics, and other valuable properties to many materials such as paper, fabrics of cellulosic materials, wool, leather, and other proteinous fibers as well as polyamides such as nylon. Other objects and advantages of the new compounds will be apparent from the description hereinafter.

The new compounds of the present invention, which may be termed diaminopolysiloxanes, have the structure of Formula I following:

I

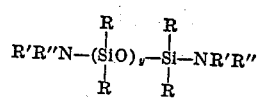

where R is a lower alkyl group having 1 to 3 carbons, methyl being preferred,

R' and R" together may be the morpholino residue =$(CH_2CH_2)_2O$, the piperidino residue —$(CH_2)_5$— or the pyrrolidino residue —$(CH_2)_4$— or separately.

R' may be phenyl, aralkyl, such as benzyl, cyclohexyl, or an alkyl group having 1 to 18 carbon atoms, R" may be hydrogen, aralkyl, such as benzyl, cyclohexyl, or an alkyl group having 1 to 18 carbon atoms, the total of carbon atoms in R' and R" being no greater than 18, with the proviso that when R' is an alkyl group having a tertiary carbon atom attached to the nitrogen, R" must be H, and y is a number having an average value from about 1 to 9.

Preferred compounds are the bis-(amino)polydimethylsiloxanes in which the amino nitrogen atoms are substituted by at least one aliphatic hydrocarbon group and the total of carbons in the substituents on each nitrogen atom is from 2 to 6. The amines NHR'R" corresponding to such amino groups (—NR'R") have boiling points in the range of about 7° C. to 110° C. Because of this property, the bis-(amino)polydimethylsiloxanes containing such amino groups are adapted to react with compounds containing reactive hydrogen at practical operating temperatures with simultaneous removal of the amine NHR'R" by simple distillation.

The new compounds of Formula I may be made by reacting corresponding dichloropolysiloxanes of Formula II with an amine of Formula II, Formulas II and III being as follows:

II

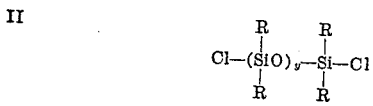

where R and y are defined before.

III      NHR'R"

where R' and R" are defined as before.

The chloropolysiloxanes of Formula II and their method of production are generally disclosed in U. S. Patent 2,381,366. These chloropolysiloxanes are reacted with two molar equivalents of an amine of Formula III. If desired, a mixture of two or more different amines within the scope of Formula III may be used to provide diaminopolysiloxanes which may include different substituted amine groups at each end of the polymeric molecule. In the reaction vessel there may be present an excess of the amine over the two molar equivalents to serve as an acceptor for the hydrogen chloride produced. Alternatively, a tertiary amine such as trimethylamine, triethylamine, pyridine or quinoline may be used as such acceptor. The reaction may be effected at a temperature of about —20° C. to room temperature, preferably between —5° C. and +10° C. The reaction is preferably carried out in an anhydrous solvent, such as benzene, toluene or xylenes, or one of the tertiary amines above. The reaction is rapid and exothermic and, therefore, it is preferred to add one of the reactants or a solution of one of the reactants to the other reactants or to a solution thereof in one of the anhydrous solvents mentioned above at a rate that is sufficiently slow to enable proper control of the temperature by cooling means. Generally, the reaction is complete at the end of the addition of one reactant to the other. Sufficient excess of amine or sufficient tertiary amine should be added to take up all of the hydrogen chloride liberated and preferably an excess over this amount is used.

An alternate mode of preparation which may be advantageous for preparing certain of the compounds of Formula I is to prepare a diaminopolysiloxane of Formula I and to interchange the amine groups by reacting the diaminopolysiloxane with another amine preferably used in excess. This interchange may be effected by simply mixing the diaminopolysiloxane with the primary or secondary amine to enter the polysiloxane by interchange and heating the mixture to a temperature adequate to distil off the amine removed. This method is particularly applicable when a low boiling amine is carried by the diaminopolysiloxane initially produced and the amine groups are to be replaced with a relatively high boiling amine. For example, bis-(methylamino)polysiloxane may be reacted with a relatively high boiling amine such as octylamine or dodecylamine by heating to distil off the methylamine liberated.

Products of Formula I are generally liquids which are relatively non-volatile and high boiling. They are generally soluble in organic solvents including benzene, toluene, xylene, aliphatic hydrocarbons, naphthenic hydrocarbons including the solvent naphthas of both aliphatic and naphthenic types as well as of aromatic type, ethyl acetate, dimethylformamide, dimethylacetamide, acetone, dioxane, chlorinated hydrocarbons including chloroform, ethylene dichloride, carbon tetrachloride and so on.

The diaminopolysiloxanes of the present invention are reactive with a wide variety of different types of compounds and, consequently, they serve as valuable chemical intermediates for the preparation of new compounds. They may react with alcohols, amines, mercaptans, amides, ureas and many other compounds containing active hydrogen for the production of new chemical derivatives having a wide variety of uses. They may be applied to paper, rayon, cotton, and other cellulosic materials containing hydroxyl groups including secondary cellulose acetate, secondary cellulose acetate butyrate, hydroxyethyl cellulose, water-soluble and alkali-soluble methyl cellulose and ethyl cellulose for modifying the properties of these various materials. Generally, they serve to impart water-repellency to simple cellulosic materials such as paper, rayon, or cotton, and also reduce the tendency of such materials, particularly textile fabrics formed from such materials, to shrink on laundering. They also impart a soft hand to fabrics and tend to render papers or other formed articles more flexible. The treatment of dyed fabrics also tends to reduce crocking thereof. Leather and fibers and fabrics of wool and other proteins, such as zein and casein, may be treated with the diaminopolysiloxanes of the present invention for reducing the shrinkage thereof on laundering and imparting water-repellent properties thereto. Fabrics of nylon which are dyed may be treated with the diaminopolysiloxanes of the present invention for reducing crocking of the dye.

Since the diaminopolysiloxanes are subject to hydrolysis on wetting with water, it is necessary that the treatment should be effected under substantially anhydrous conditions. The liquid diaminopolysiloxane may be applied by brushing, roller coating, or spraying either by itself or in solution. The application of the new compounds may be carried out simultaneously with the application of other materials if desired. In the treatment of paper, the most advantageous method of applying a compound is to spray an organic solvent solution thereof onto the paper near the end of the drying stage following the initial formation of the paper. After drying, the treated material is heated to 80° C. to 180° C. to effect reaction with the reactive centers of the material.

In the following examples which are illustrative of the present invention, the parts given are by weight unless otherwise designated:

Example 1

To a stirred mixture of 292 parts of t-butylamine and 616 parts of dry benzene, surrounded by an ice bath, there is added dropwise, the temperature being maintained at 0° to 5° C., a mixture of 234 parts of dichloropolydimethylsiloxane (average of $y=2.2$ siloxane units per molecule) and 196 parts of dry benzene. When the addition is complete, the mixture is filtered to remove the precipitate of t-butylamine hydrochloride. The filtrate is then heated on a steam bath under 20 mm. Hg vacuum to remove the benzene, leaving 278 parts of liquid product (96% yield), bis-(t-butylamino)polydimethylsiloxane.

Example 2

Fabrics of cotton, nylon, and wool are heated in a bath composed essentially of the bis-(t-butylamino)-polydimethylsiloxane obtained in Example 1 for about 8 hours under anhydrous conditions at a temperature of 105° C. After cooling, the fabrics are well washed with ether and dried in the air. On complete immersion in water, the treated fabrics show no absorption of the water while corresponding untreated control fabrics show the usual high absorptivity. The increase in water-repellency of the cotton and wool remains substantially undiminished even after washing in warm soapy water.

Example 3

The procedure of Example 1 is repeated substituting 352 parts of morpholine for the t-butylamine. The bismorpholinopolydimethylsiloxane is obtained as a liquid. A cotton fabric is made water-repellent with this polysiloxane by the procedure of Example 2 at 180° C.

Example 4

A mixture of 380 parts of dicyclohexylamine, 150 parts of triethylamine, and 1000 parts of dry toluene is stirred and cooled in an ice bath to 0° to 5° C. Then a mixture of 435 parts of dichloropolydimethylsiloxane (having an average of 7.8 siloxane units) and 300 parts of toluene is added slowly. After completion of the addition, the reaction mixture is filtered and the filtrate heated to distil all of the toluene. The bis-(dicyclohexylamino)polydimethylsiloxane remains as a non-volatile liquid.

Example 5

(a) A mixture of 50 parts of aniline and 100 parts of dry toluene is stirred and cooled in an ice bath to 0° to 5° C. Then a mixture of 53 parts of dichloropolydimethylsiloxane (y having an average of 5.5 siloxane units) and 100 parts of dry toluene is added slowly. After completion of the addition, the reaction mixture is filtered and the filtrate heated to distil all of the toluene. The slightly yellow oil which remains is used for the treatment of leather to impart water-repellency to it by proceeding as in Example 2 but at a temperature of 90° C. under 100 mm. Hg.

(b) In a similar manner, from 55 parts of t-octylamine and 53 parts of the same dichloropolydimethylsiloxane in toluene solvent (100 parts), there is prepared a light-colored oil which is treated with decolorizing charcoal in a solution in hydrocarbon solvent, filtered and recovered as a water-white oil. This oil is applied to wool at about 80° C. and imparts complete water-repellency to the wool.

Example 6

A mixture of 132 parts of the bis(t-butylamino)polydimethylsiloxane of Example 1 and 269 parts of octadecylamine is heated to about 100° C. The t-butylamine distils off, and there is recovered 250 parts of bis(octadecylamino)polydimethylsiloxane. This material is excellent for the treatment of cotton by the method of Example 2 at about 190° C., imparting a soft hand and complete hydrophobicity thereto.

Example 7

A mixture of 132 parts of the bis(t-butylamino)polydimethylsiloxane and 65 parts of di-n-butylamine is heated to about 100° C. and 35 parts of t-butylamine distilled off through a condenser. There resulted 150 parts of α-t-butylamino-ω-di-n-butylaminopolydimethylsiloxane as a colorless liquid. This may be used as in Example 5 to prepare a highly hydrophobic grade of leather.

Example 8

A mixture is made of 146 parts of diethylamine, 200 parts of pyridine and 300 parts of dry benzene. To this mixture is added a mixture of 117 parts of dichloropolydimethylsiloxane (average of $y$ is 2.2 siloxane units per molecule) and 100 parts of dry benzene. The pyridine hydrochloride is removed by filtration and the benzene is stripped on the steam bath in vacuo. The resulting yellow oil is useful in the treatment of cotton, rayon, nylon, wool, and leather to provide a hydrophobic finish as in Examples 2 and 5.

It is to be understood that changes and variations may be made without departing from the spirit and scope of the invention as defined in the appended claims.

We claim:

1. A composition comprising a bis-(amino)polydimethylsiloxane containing an average of 2 to 10 silicon atoms and in which the amino nitrogen atoms are substituted by at least one saturated aliphatic hydrocarbon group and the total of the carbon atoms in the substituents on each nitrogen atom is from 2 to 6.

2. As a composition of matter, a compound having the formula $R'HN-(Si(R)_2O)_y-Si(R)_2-NHR'$, where R is a lower alkyl group having 1 to 3 carbon atoms, $y$ is a number having an average value from about 1 to 9, and R' is an alkyl group having 4 to 8 carbon atoms and having a tertiary carbon atom attached to the adjoining nitrogen atom.

3. As a composition of matter, bis(t-butylamino)-polydimethylsiloxane containing an average of 2 to 10 silicon atoms.

4. As a composition of matter, bis(morpholino)polydimethylsiloxane containing an average of 2 to 10 silicon atoms.

5. As a composition of matter, bis(diethylamino)polydimethylsiloxane containing an average of 2 to 10 silicon atoms.

6. As a composition of matter, bis(t-octylamino)polydimethylsiloxane containing an average of 2 to 10 silicon atoms.

7. As a composition of matter, bis-N-(phenylamino)polydimethylsiloxane containing an average of 2 to 10 silicon atoms.

References Cited in the file of this patent

UNITED STATES PATENTS

| | | |
|---|---|---|
| 2,429,883 | Johannson | Oct. 28, 1947 |
| 2,503,919 | Patnode | Apr. 11, 1950 |
| 2,754,311 | Elliott | July 10, 1956 |

FOREIGN PATENTS

| | | |
|---|---|---|
| 130,374 | Sweden | Dec. 19, 1950 |

OTHER REFERENCES

George et al.: Journal of the American Chemical Society, vol. 77, pages 3493–3498, Oct. 16, 1954.